United States Patent [19]

Yasuda

[11] Patent Number: 5,654,556
[45] Date of Patent: Aug. 5, 1997

[54] RADIATION IMAGE READ-OUT METHOD AND APPARATUS AND STIMULABLE PHOSPHOR SHEET FOR THE SAME

[75] Inventor: Hiroaki Yasuda, Kanagawa-ken, Japan

[73] Assignee: Fuji Photo Film Co., Ltd., Kanagawa, Japan

[21] Appl. No.: 534,826

[22] Filed: Sep. 27, 1995

[30] Foreign Application Priority Data

Oct. 17, 1994 [JP] Japan .................................. 6-250440

[51] Int. Cl.$^6$ ............................................. G03B 42/02
[52] U.S. Cl. ..................... 250/584; 250/585; 250/586; 250/587
[58] Field of Search ............................ 250/584, 587, 250/586, 585, 582

[56] References Cited

U.S. PATENT DOCUMENTS

| 4,346,295 | 8/1982 | Tanaka et al. |
| 5,012,096 | 4/1991 | Takeda et al. ............... 250/584 |

FOREIGN PATENT DOCUMENTS

| 1-128200 | 6/1986 | Japan ................... 250/585 |
| 4-13535 | 1/1989 | Japan ................... 250/586 |
| 4-280060 | 10/1992 | Japan . |

*Primary Examiner*—Constantine Hannaher
*Attorney, Agent, or Firm*—Sughrue, Mion, Zinn, Macpeak & Seas

[57] ABSTRACT

A stimulable phosphor sheet, on which a radiation image has been stored, is exposed to stimulating rays, which cause it to emit light in proportion to the amount of energy stored thereon during its exposure to radiation. The light, which is emitted from the front surface of the stimulable phosphor sheet, and the light, which is emitted from the back surface of the stimulable phosphor sheet, are respectively detected. An image readout from the front surface of the stimulable phosphor sheet and an image readout from the back surface of the stimulable phosphor sheet are thus carried out independently of each other, two image signals being thereby obtained. An abnormal state in the image readout from each of the front and back surfaces of the stimulable phosphor sheet is detected. In cases where an abnormal state has been detected in the image readout from the front or back surface of the stimulable phosphor sheet, the image readout from the surface side of the stimulable phosphor sheet, on which side the abnormal state in the image readout has been detected, is ceased.

23 Claims, 5 Drawing Sheets

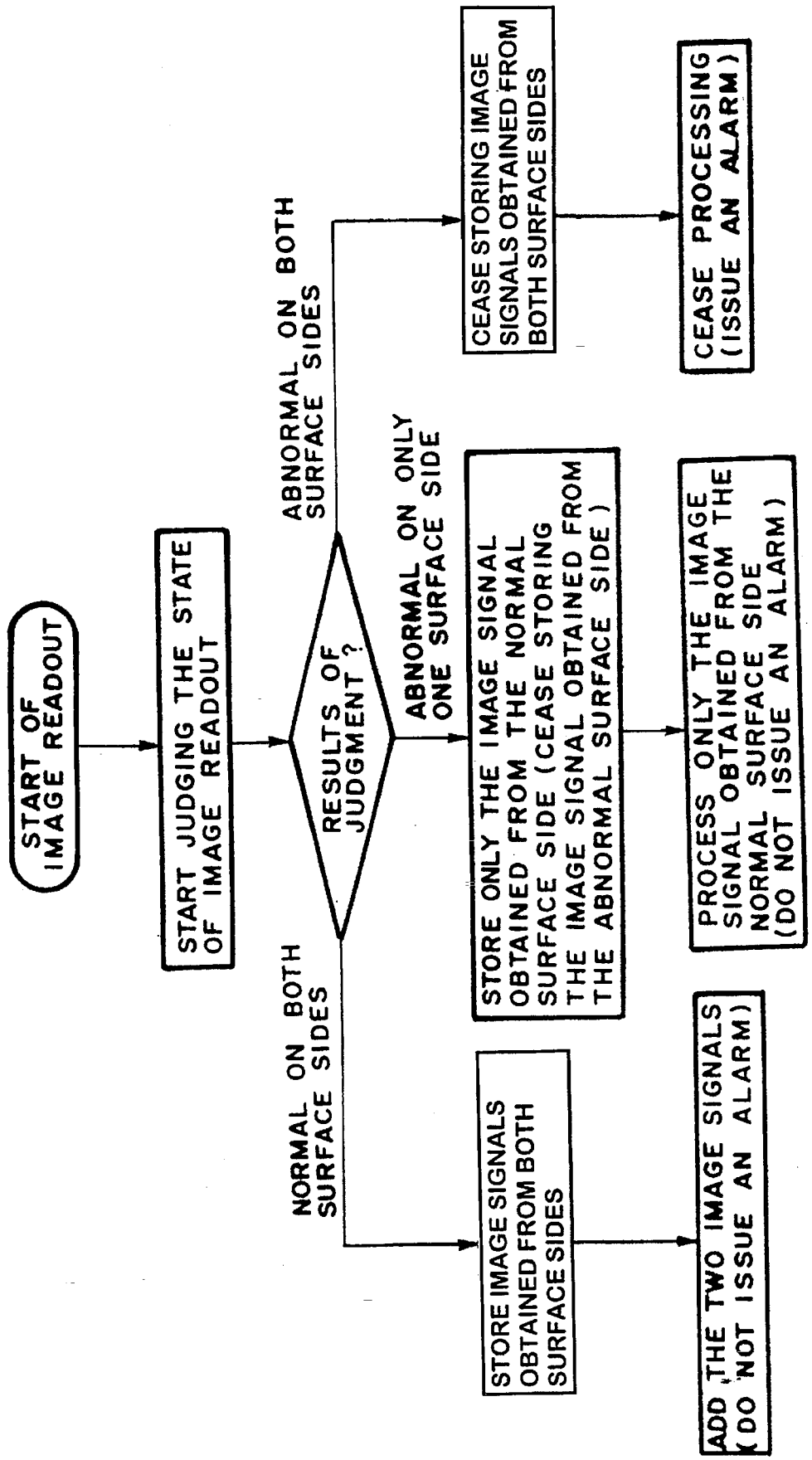

RADIATION IMAGE READ-OUT METHOD AND APPARATUS AND STIMULABLE PHOSPHOR SHEET FOR THE SAME

BACKGROUND OF THE INVENTION

1. Field of the Invention

This invention relates to a radiation image read-out method and apparatus, and a stimulable phosphor sheet for use in the radiation image read-out method and apparatus. This invention particularly relates to a radiation image read-out method and apparatus, wherein two image signals are detected from the opposite surfaces of a stimulable phosphor sheet, and a stimulable phosphor sheet for use in the radiation image read-out method.

2. Description of the Prior Art

It has been proposed to use stimulable phosphors in radiation image recording and read-out methods. Specifically, a radiation image of an object, such as a human body, is recorded on a stimulable phosphor sheet, which comprises a substrate and a layer of a stimulable phosphor overlaid on the substrate. The stimulable phosphor sheet, on which the radiation image has been stored, is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. After the image signal has been detected from the stimulable phosphor sheet, the stimulable phosphor sheet is exposed to erasing light or heat, and energy remaining on the stimulable phosphor sheet is thereby released.

The image signal, which has been obtained with a radiation image read-out method, is then subjected to image processing, such as gradation processing or frequency processing, such that a visible radiation image having good image quality can be reproduced and used as an effective tool in, particularly, the accurate and efficient diagnosis of an illness. The image signal, which has been obtained from the image processing, is then reproduced as a visible image on photographic film or on a cathode ray tube (CRT) display device and used in making a diagnosis, or the like. The stimulable phosphor sheet, from which the image signal has been detected, is exposed to erasing light or heat, and energy remaining on the stimulable phosphor sheet is thereby released. The erased stimulable phosphor sheet can then be used again for the recording of a radiation image.

Also, techniques for detecting light emitted by the opposite surfaces of a stimulable phosphor sheet have been proposed in, for example, U.S. Pat. No. 4,346,295 and Japanese Unexamined Patent Publication No. 4(1992)-280060. With the proposed techniques, the substrate of the stimulable phosphor sheet is constituted of a transparent material capable of transmitting light, which is emitted by the stimulable phosphor layer of the stimulable phosphor sheet, and the light emitted by the stimulable phosphor layer is detected approximately simultaneously from the opposite surfaces of the stimulable phosphor sheet. In this manner, the efficiency, with which the light emitted by the stimulable phosphor sheet is collected, is kept high. Further, the image signal components of two image signals having been detected from the opposite surfaces of the stimulable phosphor sheet are added together in a predetermined addition ratio, which image signal components represent corresponding picture elements on the front and back surfaces of the stimulable phosphor sheet. In this manner, the signal-to-noise ratio is kept high.

As described above, in the systems for detecting light emitted by the opposite surfaces of a stimulable phosphor sheet and adding the two obtained image signals to each other, the image signal components of the two image signals having been detected from the opposite surfaces of the stimulable phosphor sheet are added to each other, which image signal components represent corresponding picture elements on the front and back surfaces of the stimulable phosphor sheet. The systems for detecting light emitted by the opposite surfaces of a stimulable phosphor sheet and adding the two obtained image signals to each other are set such that the addition may be carried out automatically and regardless of whether each of the two image signals is or is not an appropriate image signal, which has been detected accurately. Therefore, for example, in cases where a failure has occurred with a photomultiplier of an image information read-out system or with a stimulating ray irradiating system, which is located on one surface side of the stimulable phosphor sheet, the detection of the image signal from the corresponding surface of the stimulable phosphor sheet cannot be carried out accurately. Accordingly, an image signal appropriate for use in the reproduction of a visible image cannot be obtained from the corresponding surface of the stimulable phosphor sheet. However, in the aforesaid systems for detecting light emitted by the opposite surfaces of a stimulable phosphor sheet and adding the two obtained image signals to each other, even if the failure described above has occurred, the image signal components of the inaccurate image signal, which has been detected from the one surface of the stimulable phosphor sheet, and the accurate image signal, which has been detected from the other surface of the stimulable phosphor sheet, are automatically added to each other, which image signal components represent corresponding picture elements on the front and back surfaces of the stimulable phosphor sheet. An addition image signal, which has been obtained from the addition process, is then used for reproducing a visible image, which is to be used in making a diagnosis, or the like.

However, the visible image for use in making a diagnosis, or the like, which is reproduced from the image signal obtained on the surface side of the stimulable phosphor sheet, on which an abnormal state in the image readout has occurred, is inaccurate and inappropriate for use in making a diagnosis, or the like. Also, if such an inaccurate visible image is reproduced, an accurate diagnosis, or the like, cannot be made. Further, the operation for recording a radiation image must be carried out again. In such cases, considerable time and labor will be required.

Also, in cases where an abnormal state in the image readout has occurred as described above, it is useless to carry out the operation for detecting the image signal in the abnormal state.

SUMMARY OF THE INVENTION

The primary object of the present invention is to provide a radiation image read-out method in a system for reading out a radiation image from the opposite surfaces of a stimulable phosphor sheet, on which the radiation image has been stored, wherein useless processes are omitted for a surface side of the stimulable phosphor sheet, on which side an abnormal state in the image readout has occurred, and wherein processes inappropriate for the reproduction of a visible image are prevented from being carried out.

Another object of the present invention is to provide an apparatus for carrying out the radiation image read-out method.

The specific object of the present invention is to provide a stimulable phosphor sheet for use in the radiation image read-out method.

The present invention provides a first radiation image read-out method comprising the steps of:

i) exposing a stimulable phosphor sheet, which has been exposed to radiation carrying image information of an object and on which a radiation image has thereby been stored, to stimulating rays, which cause the stimulable phosphor sheet to emit light in proportion to the amount of energy stored thereon during its exposure to radiation, and ii) detecting the light, which is emitted from the front surface of the stimulable phosphor sheet, and the light, which is emitted from the back surface of the stimulable phosphor sheet, respectively, whereby an image readout from the front surface of the stimulable phosphor sheet and an image readout from the back surface of the stimulable phosphor sheet are carried out independently of each other, two image signals being thereby obtained, wherein the improvement comprises the steps of:

a) detecting an abnormal state in the image readout from each of the front surface and the back surface of the stimulable phosphor sheet, and b) in cases where an abnormal state has been detected in the image readout from the front surface of the stimulable phosphor sheet or in the image readout from the back surface of the stimulable phosphor sheet, ceasing the image readout from the surface side of the stimulable phosphor sheet, on which side the abnormal state in the image readout has been detected.

The term "abnormal state in an image readout" as used herein means every abnormal state of the stimulating ray irradiating system and the image information read-out system, e.g. an abnormal state of the output power of the stimulating rays, an abnormal state of the scanning position of the stimulating rays, an abnormal state of the scanning speed of the stimulating rays, an abnormal state of the guiding of light emitted by the stimulable phosphor sheet, and an abnormal state of photoelectric conversion. Therefore, the detection of an abnormal state in the image readout may be carried out by monitoring the state of the irradiation of the stimulating rays and/or the state of the readout of image information independently of each other. Alternatively, instead of the state of the irradiation of the stimulating rays and/or the state of the readout of image information being monitored independently of each other, the detection of an abnormal state in the image readout may be carried out by monitoring a state on the whole, including the state of the irradiation of the stimulating rays and the state of the readout of image information.

With the technique for monitoring a state on the whole, instead of the state of the irradiation of the stimulating rays and the state of the readout of image information being monitored independently of each other, the final results, which are obtained after passing through the processes for the irradiation of the stimulating rays and the readout of image information, are investigated and, as a result, a state is monitored on the whole. For example, the monitoring of a state on the whole may be carried out by monitoring the state of emission of reference light, which is produced in a predetermined amount of light. Specifically, a predetermined amount of reference light may be produced by a reference light source, and the state of emission of the reference light may be monitored. A judgment may then be made as to whether the monitored state of emission of the reference light is or is not abnormal.

The reference light may be light, which is produced in a predetermined amount by a reference light source, or the fluorescence, which is produced in a predetermined amount by a fluorescent substance member when the fluorescent substance member is exposed to a predetermined amount of the stimulating rays. The fluorescent substance member is formed at a portion of the region of the stimulable phosphor sheet, which region is exposed to the stimulating rays. With the technique for monitoring the state of emission of the fluorescence, which is produced by the fluorescent substance member formed at a portion of the stimulable phosphor sheet, if at least one of an abnormal state of the output power of the stimulating rays, an abnormal state of the scanning position of the stimulating rays, an abnormal state of the scanning speed of the stimulating rays, an abnormal state of the guiding of light emitted by the stimulable phosphor sheet, an abnormal state of photoelectric conversion, and the like, has occurred, the value of the image signal corresponding to the level of the fluorescence produced by the fluorescent substance member will become outside the predetermined range. Therefore, an abnormal state in the image readout can be detected by monitoring the state of emission of the fluorescence, which is produced by the fluorescent substance member. This also applies to the inventions, which will be described later.

The term "ceasing an image readout" as used herein means that a process is ceased in at least one of various processing steps. For example, the guiding of the light emitted by the stimulable phosphor sheet may be ceased. Alternatively, the light emitted by the stimulable phosphor sheet may be guided, and the process for photoelectrically converting the guided light may be ceased. As another alternative, the process for photoelectrically converting the guided light may be carried out, and the use of the obtained image signal in an operation process may be ceased. A process may be ceased in any of various processing steps such that a resulting image signal may not be used ultimately for image processing.

As for the period during which the image readout is ceased for the surface side of the stimulable phosphor sheet, on which side the abnormal state in the image readout has been detected, the ceasing of the image readout may be applied:

(i) at the time at which and after the abnormal state in the image readout has been detected for one surface side of the stimulable phosphor sheet, (ii) only for the period, during which the abnormal state in the image readout is being detected, or (iii) during the entire length of a predetermined read-out period corresponding to the time at which the abnormal state in the image readout has been detected.

The present invention also provides a second radiation image read-out method comprising the steps of:

i) exposing a stimulable phosphor sheet, which has been exposed to radiation carrying image information of an object and on which a radiation image has thereby been stored, to stimulating rays, which cause the stimulable phosphor sheet to emit light in proportion to the amount of energy stored thereon during its exposure to radiation, and ii) detecting the light, which is emitted from the front surface of the stimulable phosphor sheet, and the light, which is emitted from the back surface of the stimulable phosphor sheet, respectively, whereby an image readout from the front surface of the stimulable phosphor sheet and an image readout from the back surface of the stimulable phosphor sheet are carried out independently of each other, two image signals being thereby obtained, wherein the improvement comprises the steps of:

a) detecting an abnormal state in the image readout from each of the front surface and the back surface of the stimulable phosphor sheet, the detection of an abnormal state in the image readout being carried out for each of the front surface and the back surface of the stimulable phosphor sheet independently, and b) in cases where an abnormal state in the image readout has been detected for one of the surfaces of the stimulable phosphor sheet, processing, as an effective image signal, only the image signal having been obtained from the other surface of the stimulable phosphor sheet, on which the abnormal state in the image readout has not been detected.

The term "processing, as an effective image signal, only an image signal having been obtained from the other surface of a stimulable phosphor sheet, on which an abnormal state in an image readout has not been detected" as used herein means that the image signal having been obtained from the one surface of the stimulable phosphor sheet, on which an abnormal state in the image readout has been detected, is not subjected to the image reproduction, and only the image signal having been obtained from the other surface of the stimulable phosphor sheet, on which the abnormal state in the image readout has not been detected, is subjected to the image reproduction. This also applies to the invention, which will be described later.

In cases where only the image signal having been obtained from the other surface of the stimulable phosphor sheet, on which the abnormal state in the image readout has not been detected, is thus utilized, and in cases where signal processing for the addition of image signals obtained from the opposite surfaces of the stimulable phosphor sheet is thereafter carried out, errors may be prevented from occurring in the step of the addition process by carrying out the following process:

(1) the step of the addition process is skipped, and the next step is carried out, or (2) the addition process is carried out by setting the addition ratio for every frequency such that normal side:abnormal side=1:0, or (3) the image signal obtained from the abnormal side is filled up with the same signal values as the image signal obtained from the normal side.

As for the period during which only the image signal having been obtained from the other surface of the stimulable phosphor sheet, on which the abnormal state in the image readout has not been detected, is processed as the effective image signal, the processing may be applied:

(i) at the time at which and after the abnormal state in the image readout has been detected for one surface of the stimulable phosphor sheet, (ii) only for the period, during which the abnormal state in the image readout is being detected, or (iii) during the entire length of a predetermined read-out period corresponding to the time at which the abnormal state in the image readout has been detected.

Specifically, for example, with the technique of (i), the time, at which the abnormal state in the image readout has been detected for one surface of the stimulable phosphor sheet, is taken as a starting point, and at and after that time only the image signal having been obtained from the other surface of the stimulable phosphor sheet is processed as the effective image signal regardless of whether a normal state is or is not restored from the abnormal state. With the technique of (ii), the time, at which the abnormal state in the image readout has been detected for one surface of the stimulable phosphor sheet, is taken as a starting point. Of the period beginning with that time, only for the period before a normal state is restored from the abnormal state, only the image signal having been obtained from the other surface of the stimulable phosphor sheet is processed as the effective image signal. After the normal state has been restored, both of the image signals obtained from the opposite surfaces of the stimulable phosphor sheet are processed as the effective image signals. With the technique of (iii), in cases where the abnormal state in the image readout has been detected for one surface of the stimulable phosphor sheet within a predetermined unit read-out period, only the image signal having been obtained from the other surface of the stimulable phosphor sheet, on which the abnormal state in the image readout has not been detected, is processed as the effective image signal during the entire length of the unit read-out period, going back to the beginning point of the unit read-out period. By way of example, the unit read-out period may be a single main scanning period (i.e., the period for scanning along a single main scanning line), or a period during which the entire area of a single image is read out.

The irradiation of the stimulating rays to the stimulable phosphor sheet may be carried out on only one surface side of the stimulable phosphor sheet. Alternatively, the irradiation of the stimulating rays to the stimulable phosphor sheet may be carried out on the two surface sides of the stimulable phosphor sheet.

The present invention further provides a first radiation image read-out apparatus comprising:

i) a stimulating ray irradiating system for exposing a stimulable phosphor sheet, which has been exposed to radiation carrying image information of an object and on which a radiation image has thereby been stored, to stimulating rays, which cause the stimulable phosphor sheet to emit light in proportion to the amount of energy stored thereon during its exposure to radiation, and ii) two image information read-out systems for respectively detecting the light, which is emitted from the front surface of the stimulable phosphor sheet, and the light, which is emitted from the back surface of the stimulable phosphor sheet, whereby an image readout from the front surface of the stimulable phosphor sheet and an image readout from the back surface of the stimulable phosphor sheet are carried out independently of each other, wherein the improvement comprises the provision of:

a) an abnormal state detecting means for detecting an abnormal state in the image readout from each of the front surface and the back surface of the stimulable phosphor sheet, and b) a control means for operating such that, in cases where the abnormal state detecting means has detected an abnormal state in the image readout from the front surface of the stimulable phosphor sheet or in the image readout from the back surface of the stimulable phosphor sheet, the control means may cease the image readout carried out by the image information read-out system located on the surface side of the stimulable phosphor sheet, on which side the abnormal state in the image readout has been detected.

As in the first radiation image read-out method in accordance with the present invention, the term "ceasing an image readout" as used herein for the first radiation image read-out apparatus in accordance with the present invention means that a process is ceased in at least one of various processing steps. For example, in the image information read-out system, the guiding of the light emitted by the stimulable phosphor sheet may be ceased. Alternatively, the light emitted by the stimulable phosphor sheet may be guided, and the process for photoelectrically converting the guided light may be ceased. As another alternative, the process for photoelectrically converting the guided light may be carried out, and the use of the obtained image signal in an operation process may be ceased. A process may be ceased in any of various processing steps such that a resulting image signal may not be used ultimately for image processing.

Also, in cases where two stimulating ray irradiating systems are located on the opposite surface sides of the stimulable phosphor sheet, the image readout may be ceased by ceasing the irradiation of the stimulating rays carried out by the stimulating ray irradiating system located on the surface side of the stimulable phosphor sheet, on which side an abnormal state in the image readout has been detected. Ceasing the irradiation of the stimulating rays may be carried out alone or together with the ceasing of the image readout carried out by the image information read-out system.

The abnormal state detecting means may comprise:

1) an operation monitoring means, which is associated with the stimulating ray irradiating system and/or each of the two image information read-out systems and monitors a state of the operation of the stimulating ray irradiating system and/or a state of the operation of each of the two image information read-out systems, and 2) a judgment means for making a judgment as to whether the state of the operation monitored by the operation monitoring means is or is not abnormal, the judgment means operating such that, in cases where the state of the operation monitored has been judged as being abnormal, the judgment means may feed a signal, which represents the results of the judgment, into the control means.

Alternatively, the abnormal state detecting means may detect an abnormal state on the whole. In such cases, the abnormal state detecting means may comprise:

1) a reference light source for producing reference light having a predetermined amount of light, 2) a reference light monitoring means for monitoring a state of emission of the reference light, which is produced by the reference light source, via each of the two image information read-out systems, and 3) a judgment means for making a judgment as to whether the results of the monitoring of the state of emission of the reference light, which have been obtained from the reference light monitoring means, are or are not abnormal, the judgment means operating such that, in cases where the results of the monitoring of the state of emission of the reference light have been judged as being abnormal, the judgment means may feed a signal, which represents the results of the judgment, into the control means.

As another alternative, instead of the reference light source being used, a fluorescent substance member, which is capable of producing a predetermined amount of the fluorescence when it is exposed to a predetermined amount of stimulating rays, may be formed at a portion of the region of a stimulable phosphor sheet, which region is exposed to the stimulating rays.

As described above, in cases where the judgment means has judged that a state is abnormal, the judgment means feeds a signal, which represents the results of the judgment, into the control means. Specifically, no signal may be fed into the control means before the judgment means judges that a state is abnormal, and a signal representing an abnormal state may be fed into the control means when the judgment means has judged that a state is abnormal. Alternatively, a signal representing a normal state may be continuously fed into the control means before the judgment means judges that a state is abnormal. When the judgment means has judged that a state is abnormal, the signal representing a normal state may be ceased from being fed into the control means.

The present invention still further provides a second radiation image read-out apparatus comprising:

i) a stimulating ray irradiating system for exposing a stimulable phosphor sheet, which has been exposed to radiation carrying image information of an object and on which a radiation image has thereby been stored, to stimulating rays, which cause the stimulable phosphor sheet to emit light in proportion to the amount of energy stored thereon during its exposure to radiation, and ii) two image information read-out systems for respectively detecting the light, which is emitted from the front surface of the stimulable phosphor sheet, and the light, which is emitted from the back surface of the stimulable phosphor sheet, whereby an image readout from the front surface of the stimulable phosphor sheet and an image readout from the back surface of the stimulable phosphor sheet are carried out independently of each other, wherein the improvement comprises the provision of:

a) an abnormal state detecting means for detecting an abnormal state in the image readout from each of the front surface and the back surface of the stimulable phosphor sheet, the detection of an abnormal state in the image readout being carried out for each of the front surface and the back surface of the stimulable phosphor sheet independently, and b) a control means for operating such that, in cases where the abnormal state detecting means has detected an abnormal state in the image readout for one of the surfaces of the stimulable phosphor sheet, the control means may process, as an effective image signal, only the image signal having been obtained from the other surface of the stimulable phosphor sheet, on which the abnormal state in the image readout has not been detected.

As in the aforesaid radiation image read-out methods in accordance with the present invention, as for the period during which the image readout is ceased for the surface side of the stimulable phosphor sheet, on which side the abnormal state in the image readout has been detected, or as for the period during which only the image signal having been obtained from the other surface of the stimulable phosphor sheet, on which the abnormal state in the image readout has not been detected, is processed as the effective image signal, the ceasing of the image readout or the processing as the effective image signal may be applied:

(i) at the time at which and after the abnormal state in the image readout has been detected for one surface of the stimulable phosphor sheet, (ii) only for the period, during which the abnormal state in the image readout is being detected, or (iii) during the entire length of a predetermined read-out period corresponding to the time at which the abnormal state in the image readout has been detected.

The present invention also provides a stimulable phosphor sheet for use in the radiation image read-out methods in accordance with the present invention. Specifically, the present invention further provides a stimulable phosphor sheet, which is capable of storing a radiation image thereon when it is exposed to radiation carrying image information of an object, and which emits light from its opposite surfaces when it is exposed to stimulating rays that cause it to emit light in proportion to the amount of energy stored thereon during its exposure to the radiation, wherein the improvement comprises the provision of a fluorescent substance member formed at a portion of a region of the stimulable phosphor sheet, which region is exposed to the stimulating rays, the fluorescent substance member being capable of producing the fluorescence when it is exposed to the stimulating rays.

The wavelengths of the fluorescence produced by the fluorescent substance member may be identical with or different from the wavelengths of the light, which is emitted by the stimulable phosphor sheet when it is exposed to the stimulating rays. However, the wavelengths of the fluorescence produced by the fluorescent substance member should be such that the fluorescence can be detected by each image information read-out system when the light emitted by the stimulable phosphor sheet is detected, i.e. such that the fluorescence may not be filtered out by a stimulating ray cut filter, which is ordinarily used in the image information read-out system. Two independent fluorescent substance members should preferably be formed respectively on the opposite surfaces of the stimulable phosphor sheet. However, in cases where the fluorescence produced by the fluorescent substance member is capable of passing through the inside of the stimulable phosphor sheet and detected from the opposite surfaces of the stimulable phosphor sheet, two independent fluorescent substance members need not necessarily be formed on the two surfaces of the stimulable phosphor sheet and may be formed on either one of the two surfaces of the stimulable phosphor sheet or in the inside of the stimulable phosphor sheet. In such cases, it is necessary that the wavelengths of the fluorescence produced by the fluorescent substance member are different from the wavelengths of the light, which is emitted by the stimulable phosphor sheet, and that the stimulable phosphor sheet is capable of transmitting the fluorescence.

The fluorescent substance member is formed at a portion of the region of the stimulable phosphor sheet, which region is exposed to the stimulating rays. The fluorescent substance member should preferably be located at a position at which the radiation image is not located, or at a position at which a radiation image portion, that is not important as the image information, is located.

With the radiation image read-out methods in accordance with the present invention, an abnormal state in the image readout from each of the front surface and the back surface of the stimulable phosphor sheet is detected. In cases where an abnormal state has been detected in the image readout from the front surface of the stimulable phosphor sheet or in the image readout from the back surface of the stimulable phosphor sheet, the image readout from the surface side of the stimulable phosphor sheet, on which side the abnormal state in the image readout has been detected, is ceased, or only the image signal having been obtained from the other surface of the stimulable phosphor sheet, on which the abnormal state in the image readout has not been detected, is processed as an effective image signal. Therefore, an inaccurate image signal, which has been obtained from the surface side of the stimulable phosphor sheet, on which side the abnormal state in the image readout has been detected, is not utilized in the subsequent operation processing and image processing. Accordingly, an inaccurate image can be prevented from being reproduced from the inaccurate image signal.

Also, as for the surface side of the stimulable phosphor sheet, on which side the abnormal state in the image readout has been detected, the processing on the image signal obtained from the corresponding surface of the stimulable phosphor sheet can be omitted. Therefore, useless operations can be reduced.

In cases where the detection of an abnormal state in the image readout is carried out by monitoring the state of the irradiation of the stimulating rays and/or the state of the readout of image information independently of each other, the process in which an abnormal state has occurred can be found quickly, and therefore the time required to carry out the maintenance, or the like, can be kept short.

Also, instead of the state of the irradiation of the stimulating rays and the state of the readout of image information being monitored respectively, the detection of an abnormal state in the image readout may be carried out by monitoring a state on the whole, including the state of the irradiation of the stimulating rays and the state of the readout of image information. In such cases, it is not necessary to monitor many processes respectively, the detection of an abnormal state can be simplified.

With the first and second radiation image read-out apparatuses in accordance with the present invention, the abnormal state detecting means carries out the detection of an abnormal state in the image readout from each of the front surface and the back surface of the stimulable phosphor sheet. With the first radiation image read-out apparatus in accordance with the present invention, in cases where the abnormal state detecting means has detected an abnormal state in the image readout from the front surface of the stimulable phosphor sheet or in the image readout from the back surface of the stimulable phosphor sheet, a signal for ceasing the image readout is fed from the control means to the image information read-out system (in cases where two stimulating ray irradiating systems are located on the opposite surface sides of the stimulable phosphor sheet, to the image information read-out system and/or the stimulating ray irradiating system) that is located on the surface side of the stimulable phosphor sheet, on which side the abnormal state in the image readout has been detected. In this manner, the image readout with the image information read-out system (in cases where two stimulating ray irradiating systems are located on the opposite surface sides of the stimulable phosphor sheet, the image readout with the image information read-out system and/or the stimulating ray irradiating system) from the surface side of the stimulable phosphor sheet, on which side the abnormal state in the image readout has been detected, is ceased. Alternatively, with the second radiation image read-out apparatus in accordance with the present invention, in cases where the abnormal state detecting means has detected an abnormal state in the image readout for one of the surfaces of the stimulable phosphor sheet, the control means processes, as an effective image signal, only the image signal having been obtained from the other surface of the stimulable phosphor sheet, on which the abnormal state in the image readout has not been detected. Therefore, with the first and second radiation image read-out apparatuses in accordance with the present invention, an inaccurate image signal, which has been obtained from the surface side of the stimulable phosphor sheet, on which side the abnormal state in the image readout has been detected, is not utilized in the subsequent operation processing and image processing. Accordingly, an inaccurate image can be prevented from being reproduced from the inaccurate image signal.

In cases where the operation monitoring means is associated with the stimulating ray irradiating system and/or each of the two image information read-out systems, the component, in which an abnormal state has occurred, can be found quickly, and therefore the time required to carry out the maintenance, or the like, can be kept short.

In cases where the reference light monitoring means is utilized to carry out the monitoring on the whole, it is not necessary for a plurality of operation monitoring means to be located for many components, and therefore the constitution of the radiation image read-out apparatus can be simplified.

With the stimulable phosphor sheet in accordance with the present invention, the fluorescent substance member is formed at a portion of the region of the stimulable phosphor sheet, which region is exposed to the stimulating rays. The fluorescent substance member is capable of producing a predetermined amount the fluorescence when it is exposed to a predetermined amount of the stimulating rays. Therefore, the stimulable phosphor sheet in accordance with the present invention can be utilized in the radiation image read-out method in accordance with the present invention, wherein an abnormal state in the image readout is monitored on the whole. Accordingly, the stimulable phosphor sheet in accordance with the present invention is advantageous in simplifying the detection of an abnormal state in the image readout.

BRIEF DESCRIPTION OF THE DRAWINGS

FIG. 4 is a flow chart showing how processes are carried out in a control means.

DESCRIPTION OF THE PREFERRED EMBODIMENTS

The present invention will hereinbelow be described in further detail with reference to the accompanying drawings.

Figure 1:
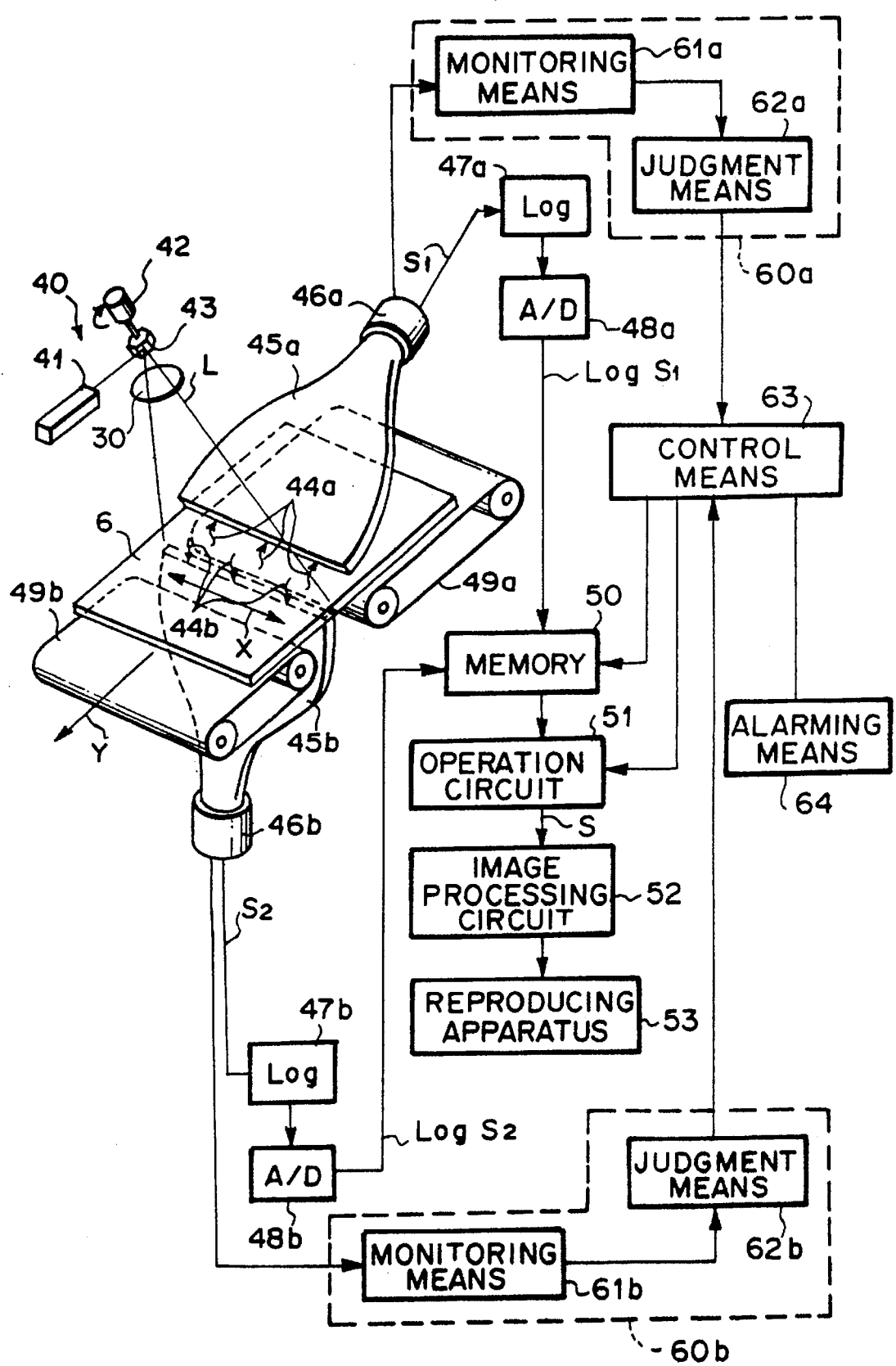
FIG. 1 is a block diagram showing a first embodiment of the radiation image read-out apparatus in accordance with the present invention.

FIG. 1 is a block diagram showing a first embodiment of the radiation image read-out apparatus in accordance with the present invention. A stimulable phosphor sheet 6, which is used in a radiation image read-out apparatus 40 shown in FIG. 1, has been exposed to radiation carrying image information of an object (not shown), and a radiation image of the object has thereby been stored on the stimulable phosphor sheet 6. When the stimulable phosphor sheet 6, on which the radiation image has been stored, is exposed to stimulating rays, it is caused by the stimulating rays to emit light in proportion to the amount of energy stored thereon during its exposure to the radiation. The light is emitted from the front and back surfaces of the stimulable phosphor sheet 6.

The stimulable phosphor sheet 6 is composed of three layers. Specifically, the stimulable phosphor sheet 6 is composed of stimulable phosphor layers, which are located on the opposite surface sides of the stimulable phosphor sheet 6, and a substrate layer, which intervenes between the stimulable phosphor layers and is capable of transmitting the stimulating rays. When the stimulating rays are irradiated to at least either one surface of the stimulable phosphor sheet 6, the light is emitted from the front and back surfaces of the stimulable phosphor sheet 6.

The stimulable phosphor sheet 6 is placed on endless belts 49a and 49b, which are rotated by motors (not shown). A laser beam source 41, a rotating polygon mirror 43, a scanning lens 30, and a motor 42 are located above the stimulable phosphor sheet 6. The laser beam source 41 produces a laser beam L serving as the stimulating rays, which cause the stimulable phosphor sheet 6 to emit light in proportion to the amount of energy stored thereon during its exposure to the radiation. The rotating polygon mirror 43 reflects and deflects the laser beam L, which has been produced by the laser beam source 41. The scanning lens 30 converges the laser beam L, which has been reflected and deflected by the rotating polygon mirror 43, on the stimulable phosphor sheet 6. Also, the scanning lens 30 serves such that the laser beam L may scan the stimulable phosphor sheet 6 at uniform speed and in main scanning directions, which are indicated by the double headed arrow X. The motor 42 rotates the rotating polygon mirror 43.

A light guide member 45a is located above and close to the position on the stimulable phosphor sheet 6 which is being scanned with the laser beam L. The light guide member 45a collects light 44a, which is emitted from the upper surface of the stimulable phosphor sheet 6 when the stimulable phosphor sheet 6 is scanned with the laser beam L, from above the stimulable phosphor sheet 6. Also, a light guide member 45b is located below the lower surface of the stimulable phosphor sheet 6 and at the position corresponding to the position, which is being scanned with the laser beam L. The light guide member 45b is located approximately perpendicularly and close to the stimulable phosphor sheet 6 and collects light 44b, which is emitted from the lower surface of the stimulable phosphor sheet 6 when the stimulable phosphor sheet 6 is scanned with the laser beam L, from below the stimulable phosphor sheet 6.

The light guide member 45a is located such that it may be in close contact with a photomultiplier 46a, which photoelectrically detects the light 44a emitted by the stimulable phosphor sheet 6. Also, the light guide member 45b is located such that it may be in close contact with a photomultiplier 46b, which photoelectrically detects the light 44b emitted by the stimulable phosphor sheet 6. The photomultipliers 46a and 46b are respectively connected to logarithmic amplifiers 47a and 47b. The logarithmic amplifiers 47a and 47b are respectively connected to analog-to-digital converters 48a and 48b. The analog-to-digital converters 48a and 48b are connected to a memory 50.

The memory 50 temporarily stores digital image signals received from the analog-to-digital converters 48a and 48b.

The digital image signals are then read from the memory 50 and fed into an addition operation circuit 51. In the addition operation circuit 51, the digital image signals are weighted with appropriate weight factors, and the image signal components of the weighted digital image signals are added to each other, which image signal components represent corresponding picture elements on the front and back surfaces of the stimulable phosphor sheet 6.

The photomultipliers 46a and 46b are also respectively connected to self-diagnosis devices 60a and 60b. The self-diagnosis device 60a comprises a monitoring means 61a and a judgment means 62a. The monitoring means 61a monitors the state of the function and the operation of the photomultiplier 46a. The judgment means 62a receives information, which represents the results of the monitoring, from the monitoring means 61a and makes a judgment as to whether the photomultiplier 46a is operating normally. In accordance with whether the photomultiplier 46a is or is not operating normally, the judgment means 62a feeds a different judgment signal to a control means 63, which will be described later. The self-diagnosis device 60b, which corresponds to the lower surface side of the stimulable phosphor sheet 6, comprises a monitoring means 61b and a judgment means 62b, which respectively work in the same manner as that in the monitoring means 61a and the judgment means 62a.

The self-diagnosis devices 60a and 60b are connected to the control means 63, which is connected to the memory 50 and the addition operation circuit 51. The control means 63 receives the judgment signals from the judgment means 62a and the judgment means 62b. In accordance with the received judgment signal, the control means 63 feeds a predetermined instruction signal into the memory 50 and gives a predetermined operation instruction to the addition operation circuit 51. The predetermined instruction signal and the predetermined operation instruction will be described later in detail.

How the radiation image is read out from the stimulable phosphor sheet 6 in the first embodiment of the radiation image read-out apparatus 40 will be described hereinbelow with reference to FIG. 1.

In a radiation image recording apparatus (not shown), the radiation image of an object is stored on the stimulable phosphor sheet 6. The stimulable phosphor sheet 6, on which the radiation image has been stored, is set at a predetermined position on the endless belts 49a and 49b. The stimulable phosphor sheet 6, which has been set at the predetermined position, is conveyed at a predetermined speed by the endless belts 49a and 49b in a sub-scanning direction indicated by the arrow Y. Also, the laser beam L is produced by the laser beam source 41. The laser beam L, which has been produced by the laser beam source 41, is reflected and deflected by the rotating polygon mirror 43, which is quickly rotated by the motor 42 in the direction indicated by the arrow. The laser beam L, which has thus been reflected and deflected by the rotating polygon mirror 43, is converged on the surface of the stimulable phosphor sheet 6 by the scanning lens 30. Also, the laser beam L is caused to scan the stimulable phosphor sheet 6 at uniform speed in the main scanning directions indicated by the double headed arrow X. The main scanning directions are approximately normal to the sub-scanning direction indicated by the arrow Y. By the main scanning of the laser beam L and the sub-scanning of the stimulable phosphor sheet 6, the entire area of the stimulable phosphor sheet 6 is exposed to the laser beam L.

When the stimulable phosphor sheet 6 is exposed to the laser beam L, the stimulable phosphor layers of the stimulable phosphor sheet 6 emit light 44a and light 44b in proportion to the amounts of energy stored thereon during their exposure to the radiation. The reference numeral 44a represents the light emitted outwardly from the front surface (i.e., the upper surface in FIG. 1) of the stimulable phosphor sheet 6. The reference numeral 44b represents the light emitted outwardly from the back surface (i.e., the lower surface in FIG. 1) of the stimulable phosphor sheet 6. The laser beam L, which has impinged upon the front surface of the stimulable phosphor sheet 6, is diffused in the inside of the stimulable phosphor sheet 6 and impinges upon the back surface of the stimulable phosphor sheet 6. Therefore, ordinarily, the sharpness of the light 44b, which is emitted from the back surface of the stimulable phosphor sheet 6, is lower than the sharpness of the light 44a, which is emitted from the front surface of the stimulable phosphor sheet 6.

The light 44a, which has been emitted from the upper surface of the stimulable phosphor sheet 6, is guided by the light guide member 45a, which is located on the upper surface side of the stimulable phosphor sheet 6, to the photomultiplier 46a. The emitted light 44a, which has thus been guided by the light guide member 45a, is photoelectrically detected by the photomultiplier 46a. The light guide member 45a is made from a light guiding material, such as an acrylic plate. The light guide member 45a has a linear input end face, which is located such that it may extend along the main scanning line on the stimulable phosphor sheet 6, and a ring-like output end face, which is located such that it may be in close contact with a light receiving face of the photomultiplier 46a. The emitted light 44a, which has entered from the input end face into the light guide member 45a, is guided through repeated total reflection inside of the light guide member 45a, emanates from the output end face, and is received by the photomultiplier 46a. The amount of the emitted light 44a representing the radiation image is converted by the photomultiplier 46a into an electric signal.

The light 44b, which has been emitted from the lower surface of the stimulable phosphor sheet 6, is guided by the light guide member 45b, which is located on the lower surface side of the stimulable phosphor sheet 6. In the same manner as that for the emitted light 44a, the emitted light 44b, which has thus been guided by the light guide member 45b, is photoelectrically detected by the photomultiplier 46b.

The photomultiplier 46a, which is located on the upper surface side of the stimulable phosphor sheet 6, generates an analog output signal $S_1$. The analog output signal $S_1$ is logarithmically amplified by the logarithmic amplifier 47a and is then digitized by the analog-to-digital converter 48a into a first image signal log $S_1$. The first image signal log $S_1$ is fed into the memory 50. Also, the photomultiplier 46b, which is located on the lower surface side of the stimulable phosphor sheet 6, generates an analog output signal $S_2$. The analog output signal $S_2$ is logarithmically amplified by the logarithmic amplifier 47b and is then digitized by the analog-to-digital converter 48b into a second image signal log $S_2$. The first image signal log $S_1$ and the second image signal log $S_2$ are temporarily stored in the memory 50.

The state of the operation of the photomultiplier 46a and the state of operation of the photomultiplier 46b are respectively monitored by the monitoring means 61a of the self-diagnosis device 60a and the monitoring means 61b of the self-diagnosis device 60b. The judgment means 62a makes a judgment as to whether the photomultiplier 46a is or is not operating normally. Also, the judgment means 62b makes a judgment as to whether the photomultiplier 46b is or is not operating normally. The judgment means 62a and the judgment means 62b feed the judgment signals, which represent the results of the judgments, into the control means 63.

In accordance with the results of the judgments made by the judgment means 62a and the judgment means 62b, the control means 63 controls the memory 50, the addition operation circuit 51, and an alarming means 64 such that one of the processes (1), (2), and (3) described below may be carried out.

(1) In cases where both of the judgment signals, which have been received from the judgment means 62a and the judgment means 62b, represent the normal state, i.e. in cases where it has been judged that both of the photomultipliers 46a and 46b located on the front and back surface sides of the stimulable phosphor sheet 6 are operating normally:

(i) The control means 63 controls the memory 50 such that it may store the first image signal log $S_1$ and the second image signal log $S_2$ obtained from the front and back surfaces of the stimulable phosphor sheet 6.

(ii) The control means 63 controls the addition operation circuit 51 such that it may exponentially convert the first image signal log $S_1$ and the second image signal log $S_2$, which have been stored in the memory 50, such that it may thereby return the image signals into the image signals $S_1$ and $S_2$, and such that it may weight the image signals $S_1$ and $S_2$ with appropriate weight factors and may add the image signal components of the weighted image signals $S_1$ and $S_2$ to each other, which image signal components represent corresponding picture elements on the front and back surfaces of the stimulable phosphor sheet 6, a digital signal S being thereby obtained.

(iii) The control means 63 controls the alarming means 64 such that it may not issue an alarm.

(2) In cases where either one of the judgment signals, which have been received from the judgment means 62a and the judgment means 62b, represents that the corresponding photomultiplier is operating normally, and the other judgment signal represents that the corresponding photomultiplier is not operating normally, i.e. in cases where it has been judged that only the operation on the other surface side of the stimulable phosphor sheet 6 is abnormal:

(i) The control means 63 controls the memory 50 such that it may store the first image signal log $S_1$ or the second image signal log $S_2$, whichever has been obtained from the surface side of the stimulable phosphor sheet 6 in the normal state, and such that it may not store the second image signal log $S_2$ or the first image signal log $S_1$, whichever has been obtained from the surface side of the stimulable phosphor sheet 6 in the abnormal state.

(ii) The control means 63 controls the addition operation circuit 51 such that it may exponentially convert the first image signal log $S_1$ or the second image signal log $S_2$, whichever have been stored in the memory 50, and such that it may calculate the values of a digital signal S representing respective picture elements.

(iii) The control means 63 controls the alarming means 64 such that it may not issue an alarm.

(3) In cases where both of the judgment signals, which have been received from the judgment means 62a and the judgment means 62b, represent that the photomultipliers 46a and 46b are not operating normally, i.e. in cases where it has been judged that both of the operations on the front and back surface sides of the stimulable phosphor sheet 6 are abnormal:

(i) The control means 63 controls the memory 50 such that it may not store the first image signal log $S_1$ and the second image signal log $S_2$ obtained from the front and back surfaces of the stimulable phosphor sheet 6.

(ii) The control means 63 controls the addition operation circuit 51 such that it may cease the processing.

(iii) The control means 63 controls the alarming means 64 such that it may issue an alarm.

Figure 5:
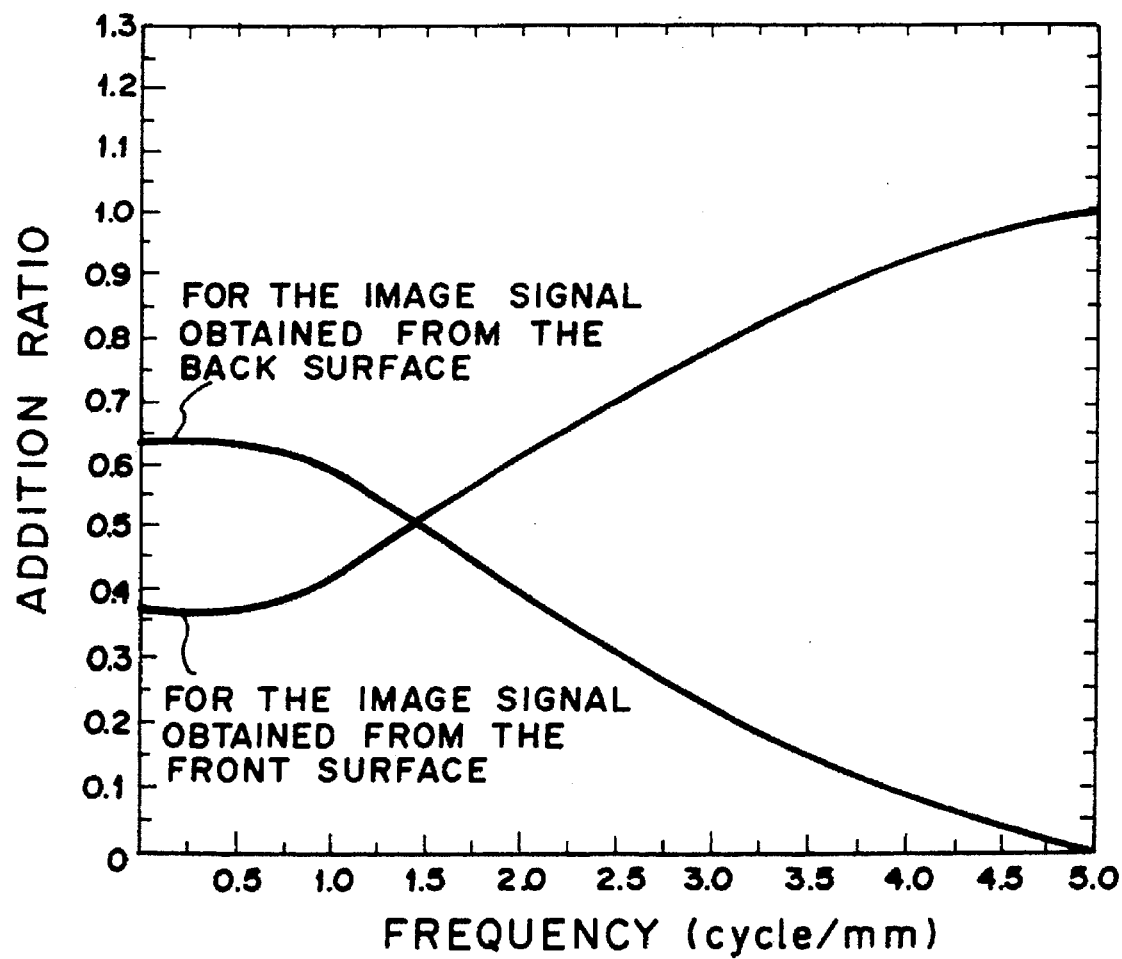
FIG. 5 is a graph showing the values of the addition ratio, which are used in the addition of two image signals obtained from front and back surfaces of a stimulable phosphor sheet and are suitable for obtaining an optimum superposition image, vs. frequency.

In cases where the control described in (1) (ii) is carried out, the addition operation circuit 51 adds the first image signal log $S_1$, which has been obtained from the front surface of the stimulable phosphor sheet 6, and the second image signal log $S_2$, which has been obtained from the back surface of the stimulable phosphor sheet 6, to each other. During the addition, the addition ratio (i.e., the weight factors) is changed for each frequency as illustrated in FIG. 5 such that an image reproduced from the addition image signal, which has been obtained from the addition of the first image signal log $S_1$ and the second image signal log $S_2$ to each other, may have good image quality and can serve as an effective tool in, particularly, the efficient and accurate diagnosis of an illness.

In cases where the control described in (2) (ii) is carried out, if the weight factors, which are set for each frequency in the control described in (1) (ii), are used, an image, which has good image quality and can serve as an effective tool in, particularly, the efficient and accurate diagnosis of an illness, cannot be obtained. Specifically, for example, in cases where the operation on the front surface side of the stimulable phosphor sheet 6 is abnormal and only the second image signal log $S_2$, which has been obtained from the back surface of the stimulable phosphor sheet 6, is used, if the weighting is carried out with the weight factor described above, the high frequency components of the image will be attenuated. Therefore, in cases where only the image signal obtained from one surface of the stimulable phosphor sheet 6 is used, the frequency characteristics are rendered flat (i.e., the addition ratio is set to be 1.0 for every frequency). Conversely, in cases where only the first image signal log $S_1$, which has been obtained from the front surface of the stimulable phosphor sheet 6, is used, if the weighting is carried out with the weight factor, which is set for each frequency in the control described in (1) (ii), the high frequency components of the image will be emphasized. Therefore, in such cases, the control is carried out such that the frequency characteristics may become flat.

The flow of the processes described above is shown in FIG. 4.

A digital image signal S is obtained from the operation processing carried out in the manner described above. The digital image signal S is logarithmically converted by an image processing circuit 52 and subjected to image processing, such as gradation processing or frequency processing. The digital image signal S, which has been obtained from the image processing circuit 52, is fed into an image reproducing apparatus 53, which is connected to the radiation image read-out apparatus 40. In the image reproducing apparatus 53, the digital image signal S is used for reproducing a visible radiation image. The image reproducing apparatus 53 may be constituted of a display means, such as a cathode ray tube (CRT) display device, or a light beam scanning recording apparatus for recording an image on photographic film. The image reproducing apparatus 53 may be replaced by an apparatus for storing the image signal in an image file on an optical disk, a magnetic disk, or the like, such that the image signal may then be fed into the display means or the light beam scanning recording apparatus.

As described above, with this embodiment, the image signal having been obtained from the surface side of the stimulable phosphor sheet 6, on which side an abnormal state in the image readout has occurred, is not stored in the memory 50. Therefore, an abnormal image signal obtained from an abnormal image readout is not processed. Accordingly, useless processes can be prevented from being carried out, and processes inappropriate for the reproduction of a visible image can be prevented from being carried out.

In this embodiment, the memory 50 is controlled such that it may not store the image signal obtained from the surface side of the stimulable phosphor sheet 6, on which side an abnormal state in the image readout has occurred. Alternatively, the detection of the abnormal image signal may be ceased. Specifically, instead of the memory 50 being controlled, the control means 63 may control the photomultiplier 46a or the photomultiplier 46b, whichever is located on the surface side of the stimulable phosphor sheet 6 on which an abnormal state in the image readout has occurred. For example, for this purpose, the supply of electric power to the photomultiplier may be ceased. Alternatively, the photoelectric conversion carried out by the photomultiplier may be ceased. As another alternative, the output from the photomultiplier may be blocked. Also, instead of the photomultiplier being controlled, the logarithmic amplifier or the analog-to-digital converter may be controlled.

Further, besides the self-diagnosis devices 60a and 60b associated with the photomultipliers 46a and 46b, self-diagnosis devices may be associated with the logarithmic amplifiers 47a and 47b and the analog-to-digital converters 48a and 48b. A control device may be located such that, in cases where an abnormal state has occurred with one of these components, the control device may cease the image readout from the side, on which the abnormal component is located.

It is also possible to employ a stimulable phosphor sheet comprising two independent stimulable phosphor layers, which are located on the front and back surfaces of the stimulable phosphor sheet, and an intermediate layer, which intervenes between the two stimulable phosphor layers and is constituted of a material, that does not transmit the stimulating rays (such as the laser beam). Also, two independent stimulating ray irradiating systems may be located on the opposite surface sides of the stimulable phosphor sheet such that they may respectively irradiate the stimulating rays to the front and back surfaces of the stimulable phosphor sheet. In such cases, self-diagnosis devices may be respectively associated with the stimulating ray irradiating systems, which are located on the opposite surface sides of the stimulable phosphor sheet. In this manner, an abnormal state in the image readout due to a failure occurring with a stimulating ray irradiating system may also be detected. When an abnormal state in the image readout due to a failure of a stimulating ray irradiating system is detected, the detection of an image signal and/or the scanning with the stimulating rays may be ceased on the surface side of the stimulable phosphor sheet 6, on which side the abnormal stimulating ray irradiating system is located.

As for the period during which the detection of the image signal and/or the scanning with the stimulating rays is ceased for the surface side of the stimulable phosphor sheet, on which side the abnormal state in the image readout has been detected, the ceasing of the detection of the image signal and/or the ceasing of the scanning with the stimulating rays may be applied in one of the ways described below:

(i) The ceasing of the detection of the image signal and/or the ceasing of the scanning with the stimulating rays is begun at the time at which the abnormal state in the image readout has been detected. The ceasing is continued until the image read-out operation with the radiation image read-out apparatus is completed.

(ii) The ceasing of the detection of the image signal and/or the ceasing of the scanning with the stimulating rays is continued only for the period, during which the abnormal state in the image readout is being detected. After the normal state in the image readout is restored, the ceasing of the detection of the image signal and/or the ceasing of the scanning with the stimulating rays is brought to an end.

(iii) The ceasing is applied to a period, going back to the start point of the scanning line, which was being scanned when the abnormal state in the image readout was detected, or going back to the start point of the image, which was being read out when the abnormal state in the image readout was detected. Even if the normal state in the image readout is restored before the end point of the scanning line or the end point of the image is reached, the ceasing of the detection of the image signal and/or the ceasing of the scanning with the stimulating rays is continued until the end point of the scanning line or the end point of the image is reached.

In cases where signal processing, such as the addition process, is carried out on the two image signals having been obtained from the upper and lower surfaces of the stimulable phosphor sheet 6, the image signal obtained from the surface side of the stimulable phosphor sheet 6, on which side the abnormal state in the image readout has been detected, may be filled up with the same signal values as the image signal obtained from the normal surface side of the stimulable phosphor sheet 6, on which side the abnormal state in the image readout has not been detected. Alternatively, the addition process may be carried out by setting the addition ratio such that normal side:abnormal side=1:0. As another alternative, the step of the addition process may be skipped, and the next step may be carried out.

In this embodiment, the self-diagnosis devices 60a and 60b are controlled so as to carry out the self-diagnosis continuously as long as the radiation image read-out apparatus is operating. Alternatively, the self-diagnosis may be carried out periodically, for example, at one-hour intervals, and may not be carried out during the other time zones.

Also, each time the operation of the radiation image read-out apparatus is started, the self-diagnosis may be carried out.

A second embodiment of the radiation image read-out apparatus in accordance with the present invention will be described hereinbelow.

Figure 2:
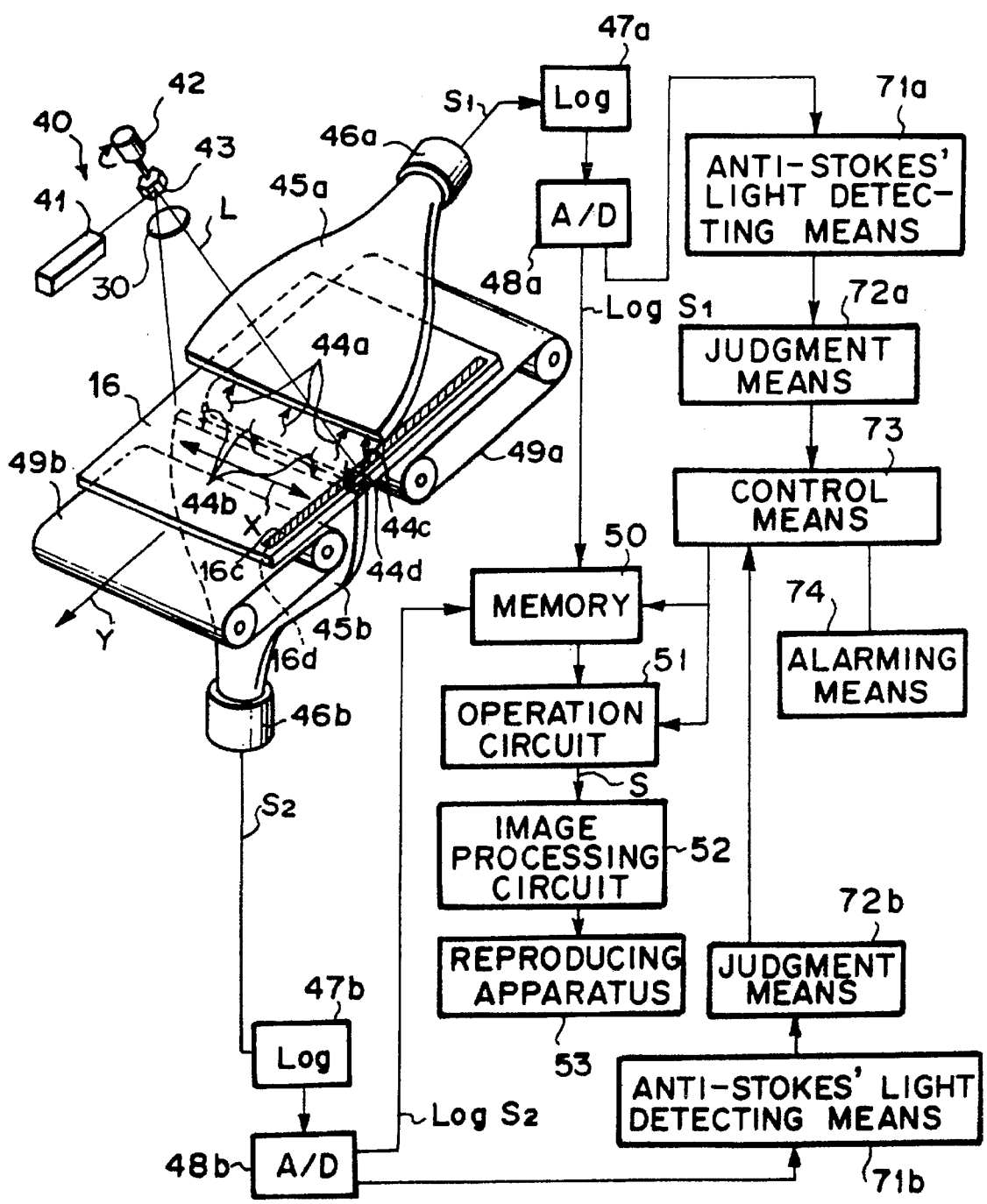
FIG. 2 is a block diagram showing a second embodiment of the radiation image read-out apparatus in accordance with the present invention.
Figure 3A:
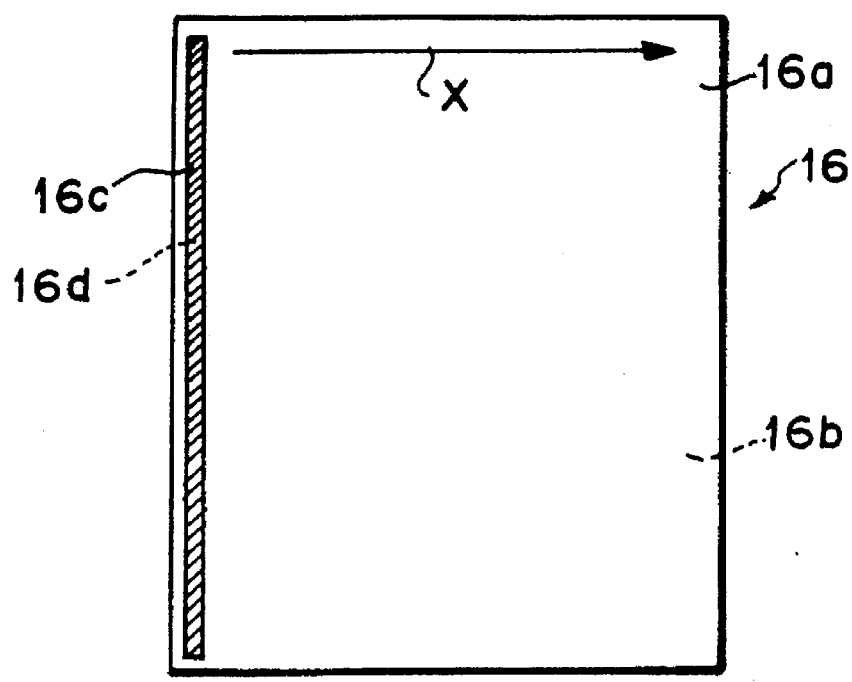
FIG. 3A is a plan view showing an embodiment of the stimulable phosphor sheet for use in the second embodiment of the radiation image read-out apparatus in accordance with the present invention, which is provided with long, narrow strip-like fluorescent substance members extending in the direction, that is normal to the main scanning direction of a laser beam.
Figure 3B:
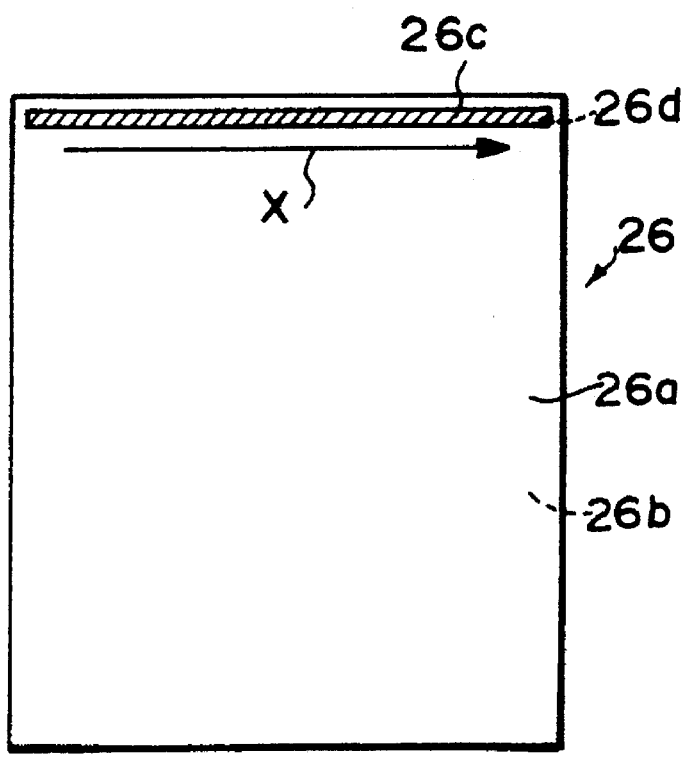
FIG. 3B is a plan view showing an embodiment of the stimulable phosphor sheet for use in the second embodiment of the radiation image read-out apparatus in accordance with the present invention, which is provided with long, narrow strip-like fluorescent substance members extending in the direction, which is parallel with the main scanning direction of a laser beam, and at the positions which can be exposed to the laser beam along a first main scanning line.

FIG. 2 is a block diagram showing the second embodiment of the radiation image read-out apparatus in accordance with the present invention. FIGS. 3A and 3B are plan views showing embodiments of the stimulable phosphor sheets for use in the radiation image read-out apparatus 40 shown in FIG. 2. Each stimulable phosphor sheet has been exposed to radiation carrying image information of an object (not shown), and a radiation image of the object has thereby been stored on the stimulable phosphor sheet. When stimulating rays are irradiated to at least either one of the surfaces of the stimulable phosphor sheet, on which the radiation image has been stored, the stimulable phosphor sheet is caused by the stimulating rays to emit light in proportion to the amount of energy stored thereon during its exposure to the radiation. The light is emitted from the front and back surfaces of the stimulable phosphor sheet.

A stimulable phosphor sheet 16 shown in FIG. 3A is provided with long, narrow strip-like fluorescent substance members 16c and 16d, which are respectively formed on a front surface 16a and a back surface 16b of the stimulable phosphor sheet 16. The fluorescent substance members 16c and 16d extend in the direction, which is normal to the main scanning direction of the stimulating rays (the laser beam). The main scanning direction is indicated by the arrow X. The fluorescent substance members 16c and 16d are located at the positions that are exposed to the laser beam each time the scanning of the laser beam along the main scanning line begins. The fluorescent substance members 16c and 16d are of the anti-Stokes' type. Specifically, when the anti-Stokes' type of fluorescent substance members 16c and 16d are exposed to the stimulating rays, they produce the fluorescence (anti-Stokes' light) having wavelengths, which are shorter than the wavelengths of the stimulating rays and are different from the wavelengths of the light emitted by the stimulable phosphor sheet. When the stimulating rays are irradiated to one surface of the stimulable phosphor sheet 16, the anti-Stokes' type of fluorescent substance members 16c and 16d produce the fluorescence.

A stimulable phosphor sheet 26 shown in FIG. 3B is provided with long, narrow strip-like, anti-Stokes' type of fluorescent substance members 26c and 26d, which are respectively formed on a front surface 26a and a back surface 26b of the stimulable phosphor sheet 26. The anti-Stokes' type of fluorescent substance members 26c and 26d extend in the direction, which is parallel with the main scanning direction of the stimulating rays (the laser beam). The main scanning direction is indicated by the arrow X. The anti-Stokes' type of fluorescent substance members 26c and 26d are located at the positions which can be exposed to the laser beam along a first main scanning line. When the stimulating rays are irradiated to one surface of the stimulable phosphor sheet 26, the anti-Stokes' type of fluorescent substance members 26c and 26d produce the fluorescence.

The stimulable phosphor sheet 16 shown in FIG. 3A is placed on the endless belts 49a and 49b, which are rotated by motors (not shown). The laser beam source 41, the rotating polygon mirror 43, the scanning lens 30, and the motor 42 are located above the stimulable phosphor sheet 16. The laser beam source 41 produces the laser beam L serving as the stimulating rays, which cause the stimulable phosphor sheet 16 to emit light in proportion to the amount of energy stored thereon during its exposure to the radiation. The rotating polygon mirror 43 reflects and deflects the laser beam L, which has been produced by the laser beam source 41. The scanning lens 30 converges the laser beam L, which has been reflected and deflected by the rotating polygon mirror 43, on the stimulable phosphor sheet 6. Also, the scanning lens 30 serves such that the laser beam L may scan the stimulable phosphor sheet 6 at uniform speed and in main scanning directions, which are indicated by the double headed arrow X. The motor 42 rotates the rotating polygon mirror 43.

The light guide member 45a is located above and close to the position on the stimulable phosphor sheet 16 which is being scanned with the laser beam L. The light guide member 45a collects light 44a, which is emitted from the front surface 16a of the stimulable phosphor sheet 16 when the stimulable phosphor sheet 16 is scanned with the laser beam L, from above the stimulable phosphor sheet 16. The light guide member 45a also collects fluorescence 44c, which is produced by the anti-Stokes' type of fluorescent substance member 16c when the anti-Stokes' type of fluorescent substance member 16c is exposed to the laser beam L, from above the stimulable phosphor sheet 16. Also, the light guide member 45b is located below the back surface 16b of the stimulable phosphor sheet 16 and at the position corresponding to the position, which is being scanned with the laser beam L. The light guide member 45b is located approximately perpendicularly and close to the stimulable phosphor sheet 16. The light guide member 45b collects light 44b, which is emitted from the back surface 16b of the stimulable phosphor sheet 16 when the stimulable phosphor sheet 16 is scanned with the laser beam L, from below the stimulable phosphor sheet 16. The light guide member 45b also collects fluorescence 44d, which is produced by the anti-Stokes' type of fluorescent substance member 16d when the anti-Stokes' type of fluorescent substance member 16d is exposed to the laser beam L, from below the stimulable phosphor sheet 16.

The light guide member 45a is located such that it may be in close contact with the photomultiplier 46a, which photoelectrically detects the light 44a emitted by the stimulable phosphor sheet 16. Also, the light guide member 45b is located such that it may be in close contact with the photomultiplier 46b, which photoelectrically detects the light 44b emitted by the stimulable phosphor sheet 16. The photomultipliers 46a and 46b are respectively connected to logarithmic amplifiers 47a and 47b. The logarithmic amplifiers 47a and 47b are respectively connected to the analog-to-digital converters 48a and 48b. The analog-to-digital converters 48a and 48b are connected to the memory 50.

The memory 50 temporarily stores digital image signals received from the analog-to-digital converters 48a and 48b. The digital image signals are then read from the memory 50 and fed into the addition operation circuit 51. In the addition operation circuit 51, the digital image signals are weighted with appropriate weight factors, and the image signal components of the weighted digital image signals are added to each other, which image signal components represent corresponding picture elements on the front and back surfaces of the stimulable phosphor sheet 16.

The analog-to-digital converter 48a is also connected to an anti-Stokes' light detecting means 71a, which detects only the digital signal representing the fluorescence 44c from the digital image signal. The analog-to-digital converter 48b is also connected to an anti-Stokes' light detecting means 71b, which detects only the digital signal representing the fluorescence 44d from the digital image signal. The digital signals, which respectively represent the fluorescence 44c and the fluorescence 44d detected by the anti-Stokes' light detecting means 71a and the anti-Stokes' light detecting means 71b, are respectively fed into judgment means 72a and judgment means 72b. The judgment means 72a and the judgment means 72b compare the levels of the received digital signals, which respectively represent the fluorescence 44c and the fluorescence 44d, with a predetermined range of signal level. In cases where the level of the digital signal falls within the predetermined range, it is judged that a normal image readout is being carried out. In cases where the level of the digital signal is outside the predetermined range, it is judged that a normal image readout is not being carried out.

Specifically, each of the anti-Stokes' type of fluorescent substance members 16c and 16d produces an amount of the fluorescence, which is proportional to the amount of the stimulating rays irradiated to it. The amount of the irradiated stimulating rays is set at a predetermined value, and therefore the amount of the fluorescence, which is to be produced by the fluorescent substance member when it is exposed to the predetermined amount of the stimulating rays, is known in advance. The range of the level of the digital signal corresponding to the amount of the fluorescence, which is to be produced by the fluorescent substance member, is set by considering a certain degree of error. Therefore, in cases where the levels of the digital signals, which respectively represent the fluorescence 44c and the fluorescence 44d, fall within the predetermined range of signal level, it can be judged that an abnormal state has not occurred in the components for the output of the laser beam L by the laser beam source 41, the scanning of the stimulable phosphor sheet 16 by the scanning system, the guiding of light by the light guide members 45a and 45b, the photoelectric conversion by the photomultipliers 46a and 46b, the logarithmic conversion by the logarithmic converters 47a and 47b, and the analog-to-digital conversion by the analog-to-digital converters 48a and 48b. Thus it can be judged that the image readout is being carried out normally on each of the two surface sides of the stimulable phosphor sheet 16.

On the other hand, in cases where an abnormal state has occurred in one of these components, the digital signal, which corresponds to the level of the detected fluorescence, becomes outside the predetermined range. Therefore, if the level of the detected fluorescence is outside the predetermined range, it can be judged that an abnormal state has occurred in one of the processes described above.

The judgment means 72a and the judgment means 72b are connected to a control means 73, which is connected to the memory 50 and the addition operation circuit 51. The control means 73 receives judgment signals from the judgment means 72a and the judgment means 72b. In accordance with the received judgment signal, the control means 73 feeds a predetermined instruction signal into the memory 50 and gives a predetermined operation instruction to the addition operation circuit 51. The predetermined instruction signal and the predetermined operation instruction are the same as those described above for the first embodiment.

How the radiation image is read out from the stimulable phosphor sheet 16 in the radiation image read-out apparatus 40 will be described hereinbelow with reference to FIG. 2.

In a radiation image recording apparatus (not shown), the radiation image of an object is stored on the stimulable phosphor sheet 16. The stimulable phosphor sheet 16, on which the radiation image has been stored, is set at a predetermined position on the endless belts 49a and 49b. The stimulable phosphor sheet 16, which has been set at the predetermined position, is conveyed at a predetermined speed by the endless belts 49a and 49b in a sub-scanning direction indicated by the arrow Y. Also, the laser beam L is produced by the laser beam source 41. The laser beam L, which has been produced by the laser beam source 41, is reflected and deflected by the rotating polygon mirror 43, which is quickly rotated by the motor 42 in the direction indicated by the arrow. The laser beam L, which has thus been reflected and deflected by the rotating polygon mirror 43, is converged on the surface of the stimulable phosphor sheet 16 by the scanning lens 30. Also, the laser beam L is caused to scan the stimulable phosphor sheet 16 at uniform speed in the main scanning directions indicated by the double headed arrow X. The main scanning directions are approximately normal to the sub-scanning direction indicated by the arrow Y. By the main scanning of the laser beam L and the sub-scanning of the stimulable phosphor sheet 16, the entire area of the stimulable phosphor sheet 16 is exposed to the laser beam L.

When the stimulable phosphor sheet 16 is exposed to the laser beam L, the stimulable phosphor layers of the stimulable phosphor sheet 16 emit light 44a and light 44b in proportion to the amounts of energy stored thereon during their exposure to the radiation.

The light 44a, which has been emitted from the front surface 16a of the stimulable phosphor sheet 16, is guided by the light guide member 45a, which is located on the front surface side of the stimulable phosphor sheet 16. The emitted light 44a, which has thus been guided by the light guide member 45a, is photoelectrically detected by the photomultiplier 46a.

Also, the long, narrow strip-like fluorescent substance member 16c is located at the position that is exposed to the laser beam L each time the scanning of the laser beam L along the main scanning line begins. When the fluorescent substance member 16c is exposed to the laser beam L, it produces the fluorescence 44c having wavelengths different from the wavelengths of the light 44a emitted by the stimulable phosphor sheet 16. The fluorescence 44c emanates from the front surface 16a of the stimulable phosphor sheet 16. The fluorescence 44c is guided by the light guide member 45a and photoelectrically detected by the photomultiplier 46a.

On the other hand, the light 44b, which has been emitted by the back surface 16b of the stimulable phosphor sheet 16, and the fluorescence 44d, which has been produced by the long, narrow strip-like fluorescent substance member 16d, are guided by the light guide member 45b, which is located on the side of the back surface 16b of the stimulable phosphor sheet 16. The emitted light 44b and the fluorescence 44d are photoelectrically detected by the photomultiplier 46b.

The photomultiplier 46a generates an analog output signal $S_1$. The analog output signal $S_1$ is logarithmically amplified by the logarithmic amplifier 47a and is then digitized by the analog-to-digital converter 48a into a first image signal log $S_1$. The first image signal log $S_1$ is fed into the memory 50. At this time, in the analog-to-digital converter 48a, the timing, with which the signal is sampled, is adjusted, and the image signal representing the fluorescence 44c is separated and digitized. In this manner, only the digital image signal representing the emitted light 44a is fed as the first image signal log $S_1$ into the memory 50. The digital image signal representing the fluorescence 44c is fed into the anti-Stokes' light detecting means 71a.

Also, the photomultiplier 46b generates an analog output signal $S_2$, which represents the light 44b emitted from the back surface 16b of the stimulable phosphor sheet 16. In the same manner as that in the analog output signal $S_1$, the digital image signal representing the fluorescence 44d is separated and fed into the anti-Stokes' light detecting means 71b. Only the digital image signal representing the emitted light 44b is fed as the second image signal log $S_2$ into the memory 50. The digital image signal representing the fluorescence 44d is fed into the anti-Stokes' light detecting means 71b.

The anti-Stokes' light detecting means 71a feeds the separated image signal, which represents the fluorescence 44c, into the judgment means 72a. Also, the anti-Stokes' light detecting means 71b feeds the separated image signal, which represents the fluorescence 44d, into the judgment means 72b.

The judgment means 72a compares the level of the received image signal, which represents the fluorescence 44c, with a predetermined range of the level of the image signal, which represents the fluorescence produced when a normal image readout is carried out. Also, the judgment means 72b compares the level of the received image signal, which represents the fluorescence 44d, with the predetermined range of the level of the image signal, which represents the fluorescence produced when a normal image readout is carried out. In cases where the level of the image signal, which represents the fluorescence 44c, or the image signal, which represents the fluorescence 44d, falls within the predetermined range of the level of the image signal, a judgment signal, which represents that the normal image readout is being carried out, is fed into the control means 73. In cases where the level of the image signal, which represents the fluorescence 44c, or the image signal, which represents the fluorescence 44d, is outside the predetermined range of the level of the image signal, a judgment signal, which represents that the normal image readout is not being carried out, i.e. that the image readout is abnormal, is fed into the control means 73.

In accordance with the results of the judgment, the control means 73 controls the memory 50, the addition operation circuit 51, and an alarming means 74 such that the processes may be carried out in the same manner as that in the control means 63 employed in the first embodiment described above.

A digital image signal S is obtained from the operation processing carried out in the manner described above. The digital image signal S is logarithmically converted by an image processing circuit 52 and subjected to image processing, such as gradation processing or frequency processing. The digital image signal S, which has been obtained from the image processing circuit 52, is fed into the image reproducing apparatus 53, which is connected to the radiation image read-out apparatus 40. In the image reproducing apparatus 53, the digital image signal S is used for reproducing a visible radiation image.

As described above, with the second embodiment, the image signal having been obtained from the surface side of the stimulable phosphor sheet 16, on which side an abnormal state in the image readout has occurred, is not stored in the memory 50. Therefore, an abnormal image signal obtained from an abnormal image readout is not processed. Accordingly, useless processes can be prevented from being carried out, and processes inappropriate for the reproduction of a visible image can be prevented from being carried out.

In the second embodiment, the memory 50 is controlled such that it may not store the image signal obtained from the surface side of the stimulable phosphor sheet 16, on which side an abnormal state in the image readout has occurred. Alternatively, the detection of the abnormal image signal may be ceased. Specifically, instead of the memory 50 being controlled, the control means 73 may control the photomultiplier 46a or the photomultiplier 46b, whichever is located on the surface side of the stimulable phosphor sheet 16 on which an abnormal state in the image readout has occurred. Also, instead of the photomultiplier being controlled, the logarithmic amplifier or the analog-to-digital converter may be controlled.

Also, in the second embodiment, the stimulable phosphor sheet 16 shown in FIG. 3A is used which is provided with the fluorescent substance members 16c and 16d extending in the direction, that is normal to the main scanning direction of the laser beam. Alternatively, the stimulable phosphor sheet 26 shown in FIG. 3B may be used. The stimulable phosphor sheet 26 is provided with the long, narrow strip-like fluorescent substance members 26c and 26d, which are respectively formed on the front surface 26a and the back surface 26b of the stimulable phosphor sheet 26. The fluorescent substance members 26c and 26d extend in the direction, which is parallel with the main scanning direction of the laser beam, and are located at the positions which can be exposed to the laser beam along the first main scanning line.

In cases where the stimulable phosphor sheet 16 shown in FIG. 3A is used, an abnormal state in the image readout is investigated for each of the main scanning lines. Therefore, the use of the stimulable phosphor sheet 16 is advantageous in that, even if an abnormal state in the image readout occurs at any instant between the beginning of the image readout and the end of the image readout, the abnormal state in the image readout can be detected.

In cases where the stimulable phosphor sheet 26 shown in FIG. 3B is used, an abnormal state in the image readout is investigated over the entire area of the first main scanning line. Therefore, the use of the stimulable phosphor sheet 26 is advantageous in that an abnormal state in the image readout can be detected with respect to every position on the main scanning line.

In the second embodiment, the period during which the detection of the image signal and/or the scanning with the stimulating rays is ceased for the surface side of the stimulable phosphor sheet, on which side the abnormal state in the image readout has been detected, may be set in the same manner as that in the first embodiment. Specifically, the ceasing of the detection of the image signal and/or the ceasing of the scanning with the stimulating rays may be applied in one of the ways described below:

(i) The ceasing of the detection of the image signal and/or the ceasing of the scanning with the stimulating rays is begun at the time at which the abnormal state in the image readout has been detected. The ceasing is continued until the image read-out operation with the radiation image read-out apparatus is completed.

(ii) The ceasing of the detection of the image signal and/or the ceasing of the scanning with the stimulating rays is continued only for the period, during which the abnormal state in the image readout is being detected. After the normal state in the image readout is restored, the ceasing of the detection of the image signal and/or the ceasing of the scanning with the stimulating rays is brought to an end.

(iii) The ceasing is applied to a period, going back to the start point of the scanning line, which was being scanned when the abnormal state in the image readout was detected, or going back to the start point of the image, which was being read out when the abnormal state in the image readout was detected. Even if the normal state in the image readout is restored before the end point of the scanning line or the end point of the image is reached, the ceasing of the detection of the image signal and/or the ceasing of the scanning with the stimulating rays is continued until the end point of the scanning line or the end point of the image is reached.

Also, as in the first embodiment, in cases where signal processing, such as the addition process, is carried out on the two image signals having been obtained from the upper and lower surfaces of the stimulable phosphor sheet 6, the image signal obtained from the surface side of the stimulable phosphor sheet 6, on which side the abnormal state in the image readout has been detected, may be filled up with the same signal values as the image signal obtained from the normal surface side of the stimulable phosphor sheet 6, on which side the abnormal state in the image readout has not been detected. Alternatively, the addition process may be carried out by setting the addition ratio such that normal side:abnormal side=1:0. As another alternative, the step of the addition process may be skipped, and the next step may be carried out.

What is claimed is:

1. A radiation image read-out method comprising the steps of:

i) exposing a stimulable phosphor sheet, which has been exposed to radiation carrying image information of an object and on which a radiation image has thereby been stored, to stimulating rays, which cause the stimulable phosphor sheet to emit light in proportion to the amount of energy stored thereon during its exposure to radiation, and ii) detecting the light, which is emitted from the front surface of the stimulable phosphor sheet, and the light, which is emitted from the back surface of the stimulable phosphor sheet, respectively, whereby an image readout from the front surface of the stimulable phosphor sheet and an image readout from the back surface of the stimulable phosphor sheet are carried out independently of each other, two image signals being thereby obtained, wherein the improvement comprises the steps of:

a) detecting an abnormal state in the image readout from each of the front surface and the back surface of the stimulable phosphor sheet, and b) in cases where an abnormal state has been detected in the image readout from the front surface of the stimulable phosphor sheet or in the image readout from the back surface of the stimulable phosphor sheet, ceasing the image readout from the surface side of the stimulable phosphor sheet, on which side the abnormal state in the image readout has been detected.

2. A radiation image read-out method comprising the steps of:

i) exposing a stimulable phosphor sheet, which has been exposed to radiation carrying image information of an object and on which a radiation image has thereby been stored, to stimulating rays, which cause the stimulable phosphor sheet to emit light in proportion to the amount of energy stored thereon during its exposure to radiation, and ii) detecting the light, which is emitted from the front surface of the stimulable phosphor sheet, and the light, which is emitted from the back surface of the stimulable phosphor sheet, respectively, whereby an image readout from the front surface of the stimulable phosphor sheet and an image readout from the back surface of the stimulable phosphor sheet are carried out independently of each other, two image signals being thereby obtained, wherein the improvement comprises the steps of:

a) detecting an abnormal state in the image readout from each of the front surface and the back surface of the stimulable phosphor sheet, said detection of an abnormal state in the image readout being carried out for each of the front surface and the back surface of the stimulable phosphor sheet independently, and b) in cases where an abnormal state in the image readout has been detected for one of the surfaces of the stimulable phosphor sheet, processing, as an effective image signal, only the image signal having been obtained from the other surface of the stimulable phosphor sheet, on which the abnormal state in the image readout has not been detected.

3. A method as defined in claim 2 wherein only the image signal having been obtained from the other surface of the stimulable phosphor sheet, on which the abnormal state in the image readout has not been detected, is processed as the effective image signal at the time at which and after the abnormal state in the image readout has been detected for one surface of the stimulable phosphor sheet.

4. A method as defined in claim 2 wherein only the image signal having been obtained from the other surface of the stimulable phosphor sheet, on which the abnormal state in the image readout has not been detected, is processed as the effective image signal only for the period, during which the abnormal state in the image readout is being detected.

5. A method as defined in claim 2 wherein only the image signal having been obtained from the other surface of the stimulable phosphor sheet, on which the abnormal state in the image readout has not been detected, is processed as the effective image signal during the entire length of a predetermined read-out period corresponding to the time at which the abnormal state in the image readout has been detected.

6. A method as defined in claim 1, 2, 3, 4, or 5 wherein the detection of the abnormal state in the image readout is carried out by monitoring the state of the irradiation of the stimulating rays and/or the state of the readout of image information.

7. A method as defined in claim 1, 2, 3, 4, or 5 wherein the detection of the abnormal state in the image readout is carried out by monitoring the state of emission of reference light, which is produced in a predetermined amount of light.

8. A method as defined in claim 2, 3, 4, or 5 wherein the processing of only the image signal having been obtained from the other surface of the stimulable phosphor sheet, on which the abnormal state in the image readout has not been detected, as the effective image signal is carried out by ceasing the exposure to the stimulating rays and/or ceasing the detection of the emitted light with respect to the one surface of the stimulable phosphor sheet, on which the abnormal state in the image readout has been detected, and by continuing the image readout from only the other surface of the stimulable phosphor sheet, on which the abnormal state in the image readout has not been detected.

9. A method as defined in claim 8 wherein the detection of the abnormal state in the image readout is carried out by monitoring the state of the irradiation of the stimulating rays and/or the state of the readout of image information.

10. A method as defined in claim 8 wherein the detection of the abnormal state in the image readout is carried out by monitoring the state of emission of reference light, which is produced in a predetermined amount of light.

11. A radiation image read-out apparatus comprising:

i) a stimulating ray irradiating system for exposing a stimulable phosphor sheet, which has been exposed to radiation carrying image information of an object and on which a radiation image has thereby been stored, to stimulating rays, which cause the stimulable phosphor sheet to emit light in proportion to the amount of energy stored thereon during its exposure to radiation, and ii) two image information read-out systems for respectively detecting the light, which is emitted from the front surface of the stimulable phosphor sheet, and the light, which is emitted from the back surface of the stimulable phosphor sheet, whereby an image readout from the front surface of the stimulable phosphor sheet and an image readout from the back surface of the stimulable phosphor sheet are carried out independently of each other, wherein the improvement comprises the provision of:

a) an abnormal state detecting means for detecting an abnormal state in the image readout from each of the front surface and the back surface of the stimulable phosphor sheet, and b) a control means for operating such that, in cases where said abnormal state detecting means has detected an abnormal state in the image readout from the front surface of the stimulable phosphor sheet or in the image readout from the back surface of the stimulable phosphor sheet, said control means may cease the image readout carried out by said image information read-out system located on the surface side of the stimulable phosphor sheet, on which side the abnormal state in the image readout has been detected.

12. A radiation image read-out apparatus comprising:

i) a stimulating ray irradiating system for exposing a stimulable phosphor sheet, which has been exposed to radiation carrying image information of an object and on which a radiation image has thereby been stored, to stimulating rays, which cause the stimulable phosphor sheet to emit light in proportion to the amount of energy stored thereon during its exposure to radiation, and ii) two image information read-out systems for respectively detecting the light, which is emitted from the front surface of the stimulable phosphor sheet, and the light, which is emitted from the back surface of the stimulable phosphor sheet, whereby an image readout from the front surface of the stimulable phosphor sheet and an image readout from the back surface of the stimulable phosphor sheet are carried out independently of each other, wherein the improvement comprises the provision of:

a) an abnormal state detecting means for detecting an abnormal state in the image readout from each of the front surface and the back surface of the stimulable phosphor sheet, said detection of an abnormal state in the image readout being carried out for each of the front surface and the back surface of the stimulable phosphor sheet independently, and b) a control means for operating such that, in cases where said abnormal state detecting means has detected an abnormal state in the image readout for one of the surfaces of the stimulable phosphor sheet, said control means may process, as an effective image signal, only the image signal having been obtained from the other surface of the stimulable phosphor sheet, on which the abnormal state in the image readout has not been detected.

13. An apparatus as defined in claim 12 wherein said control means processes only the image signal having been obtained from the other surface of the stimulable phosphor sheet, on which the abnormal state in the image readout has not been detected, as the effective image signal at the time at which and after the abnormal state in the image readout has been detected for one surface of the stimulable phosphor sheet.

14. An apparatus as defined in claim 12 wherein said control means processes only the image signal having been obtained from the other surface of the stimulable phosphor sheet, on which the abnormal state in the image readout has not been detected, as the effective image signal only for the period, during which the abnormal state in the image readout is being detected.

15. An apparatus as defined in claim 12 wherein said control means processes only the image signal having been obtained from the other surface of the stimulable phosphor sheet, on which the abnormal state in the image readout has not been detected, as the effective image signal during the entire length of a predetermined read-out period corresponding to the time at which the abnormal state in the image readout has been detected.

16. An apparatus as defined in claim 11, 12, 13, 14, or 15 wherein said abnormal state detecting means comprises:

1) an operation monitoring means, which is associated with said stimulating ray irradiating system and/or each of said two image information read-out systems and monitors a state of the operation of said stimulating ray irradiating system and/or a state of the operation of each of said two image information read-out systems, and 2) a judgment means for making a judgment as to whether the state of the operation monitored by said operation monitoring means is or is not abnormal, said judgment means operating such that, in cases where the state of the operation monitored has been judged as being abnormal, said judgment means may feed a signal, which represents the results of the judgment, into said control means.

17. An apparatus as defined in claim 11, 12, 13, 14, or 15 wherein said abnormal state detecting means comprises:

1) a reference light source for producing reference light having a predetermined amount of light, 2) a reference light monitoring means for monitoring a state of emission of the reference light, which is produced by said reference light source, via each of said two image information read-out systems, and 3) a judgment means for making a judgment as to whether the results of the monitoring of the state of emission of the reference light, which have been obtained from said reference light monitoring means, are or are not abnormal, said judgment means operating such that, in cases where the results of the monitoring of the state of emission of the reference light have been judged as being abnormal, said judgment means may feed a signal, which represents the results of the judgment, into said control means.

18. An apparatus as defined in claim 12, 13, 14, or 15 wherein the processing of only the image signal having been obtained from the other surface of the stimulable phosphor sheet, on which the abnormal state in the image readout has not been detected, as the effective image signal is carried out with said control means by ceasing the detection of the emitted light, which is carried out by one of said two image information read-out systems, with respect to the one surface of the stimulable phosphor sheet, on which the abnormal state in the image readout has been detected, and by continuing the detection of the emitted light, which is carried out by the other image information read-out system, with respect to only the other surface of the stimulable phosphor sheet, on which the abnormal state in the image readout has not been detected.

19. An apparatus as defined in claim 18 wherein said abnormal state detecting means comprises:

1) an operation monitoring means, which is associated with said stimulating ray irradiating system and/or each of said two image information read-out systems and monitors a state of the operation of said stimulating ray irradiating system and/or a state of the operation of each of said two image information read-out systems/ and 2) a judgment means for making a judgment as to whether the state of the operation monitored by said operation monitoring means is or is not abnormal, said judgment means operating such that, in cases where the state of the operation monitored has been judged as being abnormal, said judgment means may feed a signal, which represents the results of the judgment, into said control means.

20. An apparatus as defined in claim 18 wherein said abnormal state detecting means comprises:

1) a reference light source for producing reference light having a predetermined amount of light, 2) a reference light monitoring means for monitoring a state of emission of the reference light, which is produced by said reference light source, via each of said two image information read-out systems, and 3) a judgment means for making a judgment as to whether the results of the monitoring of the state of emission of the reference light, which have been obtained from said reference light monitoring means, are or are not abnormal, said judgment means operating such that, in cases where the results of the monitoring of the state of emission of the reference light have been judged as being abnormal, said judgment means may feed a signal, which represents the results of the judgment, into said control means.

21. An apparatus as defined in claim 12, 13, 14, or 15 wherein two stimulating ray irradiating systems are located on the opposite surface sides of the stimulable phosphor sheet, and the processing of only the image signal having been obtained from the other surface of the stimulable phosphor sheet, on which the abnormal state in the image readout has not been detected, as the effective image signal is carried out with said control means by ceasing the exposure to the stimulating rays, which is carried out by one of said two stimulating ray irradiating systems, and/or ceasing the detection of the emitted light, which is carried out by one of said two image information read-out systems, with respect to the one surface of the stimulable phosphor sheet, on which the abnormal state in the image readout has been detected, and by continuing the image readout from only the other surface of the stimulable phosphor sheet, on which the abnormal state in the image readout has not been detected.

22. An apparatus as defined in claim 21 wherein said abnormal state detecting means comprises:

1) an operation monitoring means, which is associated with each of said two stimulating ray irradiating systems and/or each of said two image information read-out systems and monitors a state of the operation of each of said two stimulating ray irradiating systems and/or a state of the operation of each of said two image information read-out systems, and 2) a judgment means for making a judgment as to whether the state of the operation monitored by said operation monitoring means is or is not abnormal, said judgment means operating such that, in cases where the state of the operation monitored has been judged as being abnormal, said judgment means may feed a signal, which represents the results of the judgment, into said control means.

23. An apparatus as defined in claim 21 wherein said abnormal state detecting means comprises:

1) a reference light source for producing reference light having a predetermined amount of light, 2) a reference light monitoring means for monitoring a state of emission of the reference light, which is produced by said reference light source, via each of said two image information readout systems, and 3) a judgment means for making a judgment as to whether the results of the monitoring of the state of emission of the reference light, which have been obtained from said reference light monitoring means, are or are not abnormal, said judgment means operating such that, in cases where the results of the monitoring of the state of emission of the reference light have been judged as being abnormal, said judgment means may feed a signal, which represents the results of the judgment, into said control means.

* * * * *